United States Patent
Wallestad et al.

(10) Patent No.: US 12,471,537 B2
(45) Date of Patent: Nov. 18, 2025

(54) HYDRAULIC MOTOR CONTROL SYSTEM AND METHOD

(71) Applicant: DEERE & COMPANY, Moline, IL (US)

(72) Inventors: Steven D. Wallestad, Ankeny, IA (US);
Mark A. Cracraft, Johnston, IA (US);
James T. Noonan, Bondurant, IA (US)

(73) Assignee: Deere & Company, Moline, IL (US)

( * ) Notice: Subject to any disclaimer, the term of this patent is extended or adjusted under 35 U.S.C. 154(b) by 1119 days.

(21) Appl. No.: 17/349,463

(22) Filed: Jun. 16, 2021

(65) Prior Publication Data
US 2022/0030772 A1 Feb. 3, 2022

Related U.S. Application Data

(60) Provisional application No. 63/059,646, filed on Jul. 31, 2020.

(51) Int. Cl.
F04B 19/04 (2006.01)
A01D 46/08 (2006.01)
A01F 15/08 (2006.01)
A01F 15/10 (2006.01)
F04B 23/04 (2006.01)
F04B 49/20 (2006.01)

(52) U.S. Cl.
CPC .......... *A01F 15/085* (2013.01); *A01D 46/08* (2013.01); *A01F 15/106* (2013.01); *F04B 19/04* (2013.01); *F04B 23/04* (2013.01); *F04B 49/20* (2013.01)

(58) Field of Classification Search
CPC F04B 17/05; F04B 49/20; F15B 11/17; F15B 2211/41572
See application file for complete search history.

(56) References Cited

U.S. PATENT DOCUMENTS

| | | | |
|---|---|---|---|
| 2010/0050621 A1* | 3/2010 | Beschorner | E02F 9/2235 60/329 |
| 2019/0059225 A1* | 2/2019 | Wallestad | A01D 46/14 |
| 2020/0166100 A1* | 5/2020 | Noonan | F16D 25/0638 |

FOREIGN PATENT DOCUMENTS

| | | |
|---|---|---|
| CN | 201661539 U | 12/2010 |
| CN | 202557788 U | 11/2012 |
| CN | 202732521 U | 2/2013 |
| CN | 203189367 U | 9/2013 |

(Continued)

OTHER PUBLICATIONS

Machine Translation of Foreign Reference CN-108718670-A.*

*Primary Examiner* — Nathaniel E Wiehe
*Assistant Examiner* — Daniel S Collins
(74) *Attorney, Agent, or Firm* — Taft Stettinius & Hollister LLP; Stephen F. Rost (57) ABSTRACT

An electrohydraulic system for a work machine includes a pump, a motor fluidly coupled to the pump, a subassembly driven by the motor, and a rate-control valve fluidly coupled to the pump and the motor. The rate-control valve is movable through a range of positions. A present speed of the motor is proportional to a present position of the rate-control valve. The present position of the rate-control valve is adjustable by varying a current supplied to the rate-control valve. The supply of current to the rate-control valve is adjusted based on the difference between the present speed of the motor and a target speed of the motor.

18 Claims, 7 Drawing Sheets

(56) References Cited

FOREIGN PATENT DOCUMENTS

| | | | | |
|---|---|---|---|---|
| CN | 204661185 U | 9/2015 | | |
| CN | 108718670 A | * 11/2018 | ............. | A01D 41/02 |
| CN | 210003377 U | 1/2020 | | |
| CN | 111279870 A | 6/2020 | | |
| GB | 613542 A | 11/1948 | | |
| JP | H07266916 A | 10/1995 | | |

* cited by examiner

HYDRAULIC MOTOR CONTROL SYSTEM AND METHOD

RELATED APPLICATIONS

This application claims priority to U.S. Provisional Application Ser. No. 63/059,646, filed Jul. 31, 2020, the disclosure of which is hereby incorporated by reference in its entirety.

FIELD OF THE DISCLOSURE

The present disclosure relates to a work machine such as a cotton harvester and, in particular, to an electrohydraulic system and method for a work machine such as a cotton harvester.

BACKGROUND OF THE DISCLOSURE

Subassemblies of work machines, such as a feeder assembly and a beater assembly of a cotton harvester, are often driven by hydraulic motors and pumps. In hydraulic systems having a pump and a motor, the pump facilitates fluid flow to the motor. In such hydraulic systems, there is often an undesired compromise between cost, hydraulic efficiency, mechanical and volumetric change over time of the hydraulic system components, and precision of motor speed control.

A hydraulic system with a fixed displacement motor and a fixed displacement pump may provide several advantageous over a hydraulic system having a pressure compensated pump, load sense pump, or other variable displacement pump. For example, the fixed displacement components may provide a low cost solution with high hydraulic efficiency because the fixed displacement pump is only required to facilitate sufficient fluid flow to drive the fixed displacement motor. However, problems may arise, for example, since the fixed displacement motor experiences various loading conditions, and therefore, demands varying flow rates of fluid.

Other problems may arise as well. For example, the fixed displacement pump may still have some variation in its output of fluid flow because the pump may be driven, for example, by an engine that does not operate at a constant speed. The varying output of fluid flow from the pump results in downstream flow variability to the fixed displacement motor. Additionally, as the hydraulic system operates over time, the mechanical and volumetric efficiencies of the motor and the pump, for example, can vary, which changes the flow rate of fluid to the motor, thereby changing the motor speed in any undesired fashion. Similarly, a variation in fluid temperature or viscosity can impact the motor speed in an undesired fashion, if not accounted for.

Therefore, what is needed is a hydraulic system using a fixed displacement pump and a fixed displacement motor, wherein the hydraulic system also has the ability to accurately and precisely control motor speed despite the variables described above.

SUMMARY

In an illustrative embodiment, a work machine comprises: a first pump; a first motor fluidly coupled to the first pump; a first subassembly coupled to and driven by the first motor; and a first rate-control valve fluidly coupled to the first pump and the first motor and movable through a range of positions to adjust a flow rate to the first motor; wherein a speed of the first motor is proportional to a present position of the first rate-control valve.

In some embodiments, the first subassembly is one of a feeder assembly and a beater assembly, each configured to process harvested cotton.

In some embodiments, the work machine further comprises: a second pump; an engine coupled to and configured to provide power to the first pump and the second pump; a second motor fluidly coupled to the second pump; a second subassembly coupled to and rotatably driven by the second motor; and a second rate-control valve movable through a range of positions to adjust a flow rate to the second motor; wherein a speed of the second motor is proportional to a present position of the second rate-control valve; and wherein the second subassembly is the other of a feeder assembly and a beater assembly.

In some embodiments, the work machine further comprises a pressure regulation valve fluidly coupled to the first rate-control valve at an inlet side of the first rate-control valve and an outlet side of the first rate-control valve. The pressure regulation valve is configured to facilitate fluid flow across first rate-control valve at a pressure that is more consistent than a pressure across the first motor based on a load applied to the first motor by the first subassembly.

In some embodiments, the first rate-control valve is normally biased toward an open position. The speed of the first motor is inversely proportional to a flow rate of fluid across the first rate-control valve.

In some embodiments, the first rate-control valve is normally biased toward a closed position. The speed of the first motor is directly proportional to a flow rate of fluid across the first rate-control valve.

In some embodiments, the work machine further comprises a controller operatively coupled to the first rate-control valve and configured to output current-adjustment signals to the first rate-control valve to adjust the present position of the first rate-control valve.

In some embodiments, the work machine further comprises a primary motor engagement valve fluidly coupled to the first pump and the first motor. The controller is operatively coupled to the primary motor engagement valve and configured to output a first signal to the primary motor engagement valve, prior to outputting the current-adjustment signals, to cause movement of primary motor engagement valve which facilitates fluid flow to the first motor.

In some embodiments, the work machine further comprises, a secondary motor engagement valve fluidly coupled to the first pump and the first motor and configured to move from a closed position to an open position in response to movement of the primary motor engagement valve to facilitate fluid flow to the first rate-control valve.

In some embodiments, the first motor is a fixed displacement motor. In some embodiments, the first pump is a fixed displacement pump.

In another illustrative embodiment, a cotton harvester comprises: a pump; a motor fluidly coupled to the pump; a rotatable subassembly coupled to and rotatably driven by the motor, the rotatable subassembly being one of a feeder assembly and a beater assembly, each being configured to process harvested cotton; and a rate-control valve fluidly coupled to the pump and the motor and movable through a range of positions to adjust a fluid flow rate to the motor.

In some embodiments, the cotton harvester further comprises a primary motor engagement valve fluidly coupled to the pump and the motor; and a controller operatively coupled to the rate-control valve and the primary motor engagement valve. The controller is configured output a first signal to: (i) the primary motor engagement valve causing movement of the primary motor engagement valve which facilitates fluid flow to the motor and (ii) the rate-control valve. The controller is further configured to output a second signal to the rate-control valve causing movement of the rate-control valve to adjust the fluid flow rate to the motor.

In some embodiments, the controller includes a memory having a target motor speed stored thereon. The controller is operatively coupled to a speed sensor configured to monitor a present motor speed. The controller is configured to receive a signal indicative of the present motor speed from the speed sensor. The movement of the rate-control valve is based on the target motor speed and the present motor speed.

In some embodiments, the cotton harvester further comprises a pressure regulation valve fluidly coupled to the rate-control valve at an inlet side of the rate-control valve and an outlet side of the rate-control valve. The pressure regulation valve is configured to facilitate fluid flow across rate-control valve at a pressure that is more consistent than a pressure across the motor based on a load applied to the motor by the subassembly.

In another illustrative embodiment, a method of controlling motor speed for a subassembly of a work machine comprises: adjusting a position of a first valve to facilitate fluid flow to a second valve and to a motor that is configured to drive operation of the subassembly; and adjusting a position of the second valve to adjust the fluid flow to the motor.

In some embodiments, the method further comprises: determining a present speed of the motor; and comparing a target speed of the motor to the present speed of the motor.

In some embodiments, adjusting the position of the second valve to adjust the fluid flow to the motor includes altering a current supplied to the second valve to adjust the present speed of the motor toward the target speed of the motor.

In some embodiments, the motor is a fixed displacement motor. In some embodiments, the pump is a fixed displacement pump.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
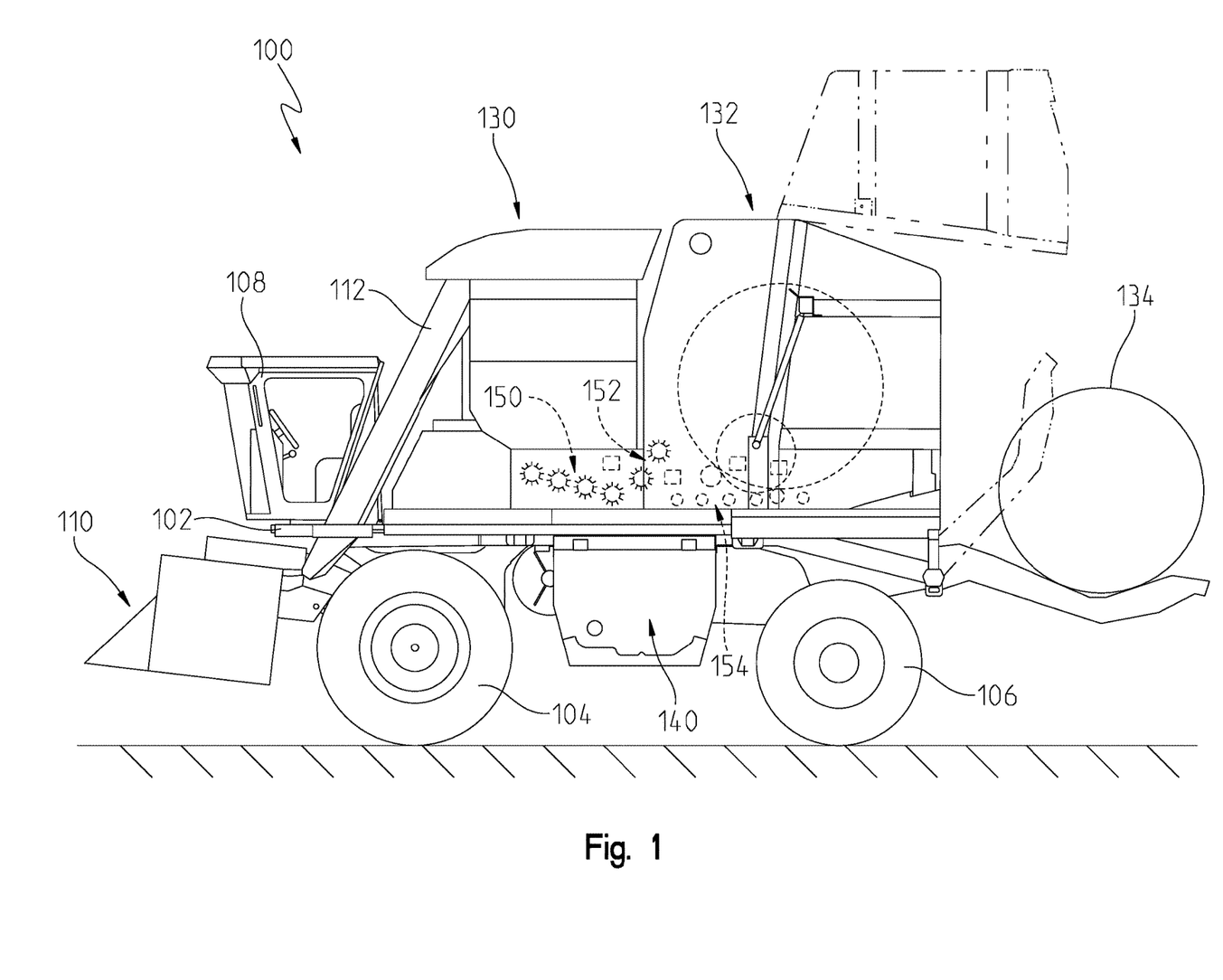
FIG. 1 is a side view of a cotton harvester showing a feeder assembly and a beater assembly.

Referring now to FIG. 1, a cotton harvester 100 is shown having a main frame 102 supported above the ground by front wheels 104 and rear wheels 106. An operator station or cab 108 is supported at the front end of the main frame 102 above cotton harvesting units 110, which remove cotton from plants and direct the removed cotton into an air duct system 112 toward an accumulator system 130.

In the illustrative embodiment, the accumulator system 130 is coupled to the main frame 102 behind the cab 108. The accumulator system 130 stores cotton, which is then processed by a series of subassemblies (e.g., 150, 152, 154). The subassemblies may include a metering assembly 150 having, for example, four metering rollers rotatable to move the harvested cotton toward a beater assembly 152. The beater assembly 152 includes, for example, two beaters rotatable to condition the harvested cotton and move the harvested cotton toward a feeder assembly 154. The feeder assembly 154 includes, for example, a feeder belt supported by six feed rollers. The feeder assembly 154 receives the conditioned harvested cotton from the beater assembly 152 and distributes the cotton to a module builder 132 which first forms a compressed mat of cotton and then rolls the mat into a compact bale or module 134.

Figure 2:
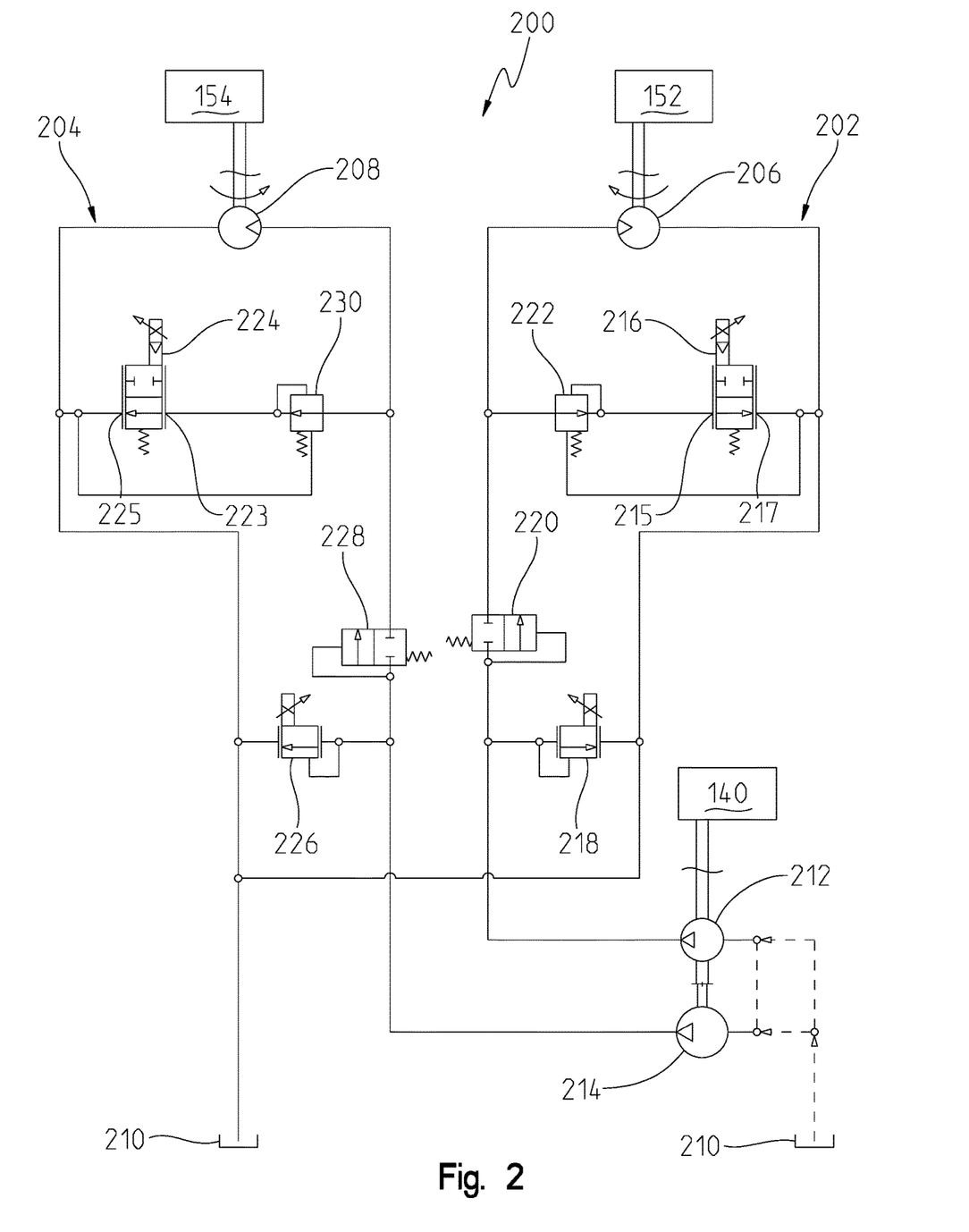
FIG. 2 is a schematic view of two hydraulic subsystems each showing a fixed displacement pump, a fixed displacement motor, and a rate-control valve configured to adjust a flow rate of fluid to the fixed displacement motor.

In some embodiments, as suggested by FIG. 2, the beater assembly 152 is driven by a first motor 206, and the feeder assembly 154 is driven by a second motor 208. The respective loads on the motors 206, 208 may vary based on the amount of work required to process the harvested cotton introduced to the beater assembly 152 and the feeder assembly 154. Hydraulic subsystems 202 and 204 that facilitate fluid flow to hydraulic motors, such as the first motor 206 and the second motor 208, will be described in greater detail below.

The cotton harvester 100 may have several motors and drive systems for powering components as described in more detail below; however, a prime mover 140 is the primary source of power to the components. More specifically, in some embodiments, the prime mover 140 may be a diesel or gas engine. The prime mover 140 may provide power to a ground drive, cotton fan, engine fan, and hydraulic motors to name a few components. Further, the components may be powered through hydraulic pumps, electric generators, and/or mechanical drivetrains to name a few of the drive systems for the components driven by the prime mover 140.

While diesel and gas engines are described herein, in one example, the prime mover 140 may be a turbine engine. In another example, the prime mover 140 may be an electric motor. In yet another example, the prime mover 140 may by a hybrid combination of the diesel, gas, or turbine engine along with an electric generator and motor. Accordingly, many different types of prime movers 140 are considered herein, and no single type should be limiting.

It should also be appreciated that this disclosure is not limited to the cotton harvester 100 shown in FIG. 1 and described above. Rather, this disclosure applies to any work machine suitable for use with the electrical or hydraulic subsystems and methods described herein.

Referring again to FIG. 2, an illustrative hydraulic system 200 for a work machine, such as the cotton harvester 100, is shown. The hydraulic system 200 includes the first hydraulic motor 206 illustratively coupled to and configured to drive operation of the beater assembly 152 and the second hydraulic motor 208 illustratively coupled to and configured to drive operation of the feeder assembly 154.

In this embodiment, the first and second hydraulic motors 206, 208 are each fixed displacement motors. While two subassemblies 152, 154 and two hydraulic subsystems 202, 204 are shown, in some embodiments, a single hydraulic subsystem may be used to power a single subassembly. Further, the disclosed hydraulic subsystems are not limited to driving operation of the beater assembly 152 or feeder assembly 154; the hydraulic subsystems described herein may drive operation of any suitable subassembly on any suitable work machine.

In the illustrative embodiment, the first and second hydraulic subsystems 202, 204 may share a common tank or common tanks 210, which may be referred to reservoirs or sumps. Each hydraulic subsystem 202, 204 includes a distinct pump. For example, the first hydraulic subsystem 202 includes a first pump 212, and the second hydraulic system includes a second pump 214. In the illustrative embodiment, the first and second pumps 212, 214 are disposed in a stacked arrangement meaning that the second pump 214 is rotatably driven by an output shaft of the first pump 212, and the first pump is rotatably driven by an output shaft of the prime mover 140. In any event, the prime mover 140 drives operation of each pump 212, 214. The arrangement of the pumps 212, 214 shown in FIG. 2 is merely exemplary; for example, the disclosure also contemplates arrangements in which the pumps 212, 214 are not stacked.

In the illustrative embodiment, each pump 212, 214 is a fixed displacement pump. In this embodiment, the first pump 212 and the second pump 214 output fluid at differing flow rates relative to one another, the flow rates being sufficient to drive the fixed displacement motor 206 and the fixed displacement motor 208, respectively. In some embodiments, the first pump 212 and the second pump 214 may output fluid at the same flow rate relative to one another.

As shown in FIG. 2, the first hydraulic subsystem 202 includes a first rate-control valve 216 fluidly coupled to the first pump 212 and the first motor 206. The first rate-control valve 216 is movable through a range of positions to adjust the flow rate to the first motor 206. A present speed of the first motor 206 is based on the flow rate of fluid to the first motor 206, and therefore, the present speed of the first motor 206 is proportional to the present position of the first rate-control valve 216.

In the illustrative embodiment, the first rate-control valve 216 is a solenoid-operated proportional valve, such that a present position of the first rate-control valve 216 is adjustable proportionally to an amount of current supplied to the first rate-control valve 216. Therefore, the speed of the first motor 206 is ultimately proportional to the amount of current supplied to the first rate-control valve 216.

In the illustrative embodiment shown in FIG. 2, the first rate-control valve 216 is a normally-open proportional valve, such that when no current is supplied to the first rate-control valve 216, the first rate-control valve 216 is disposed in an open position. Further, the first rate-control valve 216 is a bypass valve arranged in parallel with the first motor 206, such that as the fluid flow rate across the first rate-control valve 216 increases, the fluid flow rate to the first motor 206 decreases. Therefore, the present speed of the first motor 206 is inversely proportional to the flow rate of fluid across the first rate-control valve 216.

As shown in FIG. 2, the first hydraulic subsystem 202 illustratively includes a primary motor engagement valve 218 and a secondary motor engagement valve 220. Each motor engagement valve 218, 220, is fluidly coupled to the first pump 212 and the first motor 206. In this embodiment, the primary and secondary motor engagement valves 218, 220 cooperate to facilitate or to prevent fluid flow to the first motor 206 and the first rate-control valve 216.

In the illustrative embodiment, the primary motor engagement valve 218 is a solenoid-operated proportional relief valve that is movable between an open position and a closed position. A present position of the primary motor engagement valve 218 is adjustable proportionally to the amount of current supplied thereto. When the primary motor engagement valve 218 is in the open position, the primary motor engagement valve 218 facilitates fluid flow from the first pump 212 to the tank 210. When the primary motor engagement valve 218 is in the closed position, flow across the primary motor engagement valve 218 is blocked, and therefore, pressure builds on an inlet side of the secondary motor engagement valve 220.

In the illustrative embodiment, the secondary motor engagement valve 220 is a pilot-operated blocking valve. As pressure builds on the inlet side of the secondary motor engagement valve 220, the secondary motor engagement valve 220 is moved from a closed position to an open position. When the secondary motor engagement valve 220 is the open position, the valve 220 facilitates fluid flow to the first motor 206 and the first rate-control valve 216. It should be appreciated that if the secondary motor engagement valve 220 allows undesired leakage therethrough, having a normally-open first rate-control valve 216 is advantageous because the first rate-control valve 216 diverts the leaked fluid away from the first motor 206, which mitigates motor creep.

Further, it should be appreciated that, in some embodiments, when the primary motor engagement valve 218 is in the closed position, the valve 218 acts as a relief valve. In this case, in the closed position, the primary motor engagement valve 218 facilitates fluid flow across itself when the pressure at the valve 218 is above a predefined threshold pressure associated with the valve 218.

In the illustrative embodiment shown in FIG. 2, the first hydraulic subsystem 202 includes a pressure regulation valve 222. The pressure regulation valve 222 is fluidly coupled, via a first line, to an inlet side 215 of the first rate-control valve 216 and fluidly coupled, via a second line, to an outlet side 217 of the first rate-control valve 216. The first motor 206 may demand fluid at varying flow rates based on the load on the first motor 206. The pressure regulation valve 222 is configured to facilitate fluid flow across the first rate-control valve 216 at a flow rate that is more consistent over time than the flow rate across the first motor 206 based on a load applied to the first motor 206 by the subassembly coupled thereto.

In some embodiments, the pressure regulation valve 222 may be a compensator valve having a spring coupled to a spool that is movable within the valve to regulate the flow rate of fluid output from the pressure regulation valve 222 to the inlet side 215 of the first rate-control valve 216. Thus, the pressure regulation valve 222 limits the range of pressures experienced by the first rate-control valve 216, such that first rate-control valve 216 only needs to move through a finite range of positions, as compared to the range of positions that the first rate-control valve 216 would be required to move through without the pressure regulation valve 222. Accordingly, the first rate-control valve 216 may have a reduced flow rate capacity compared to arrangements lacking the pressure regulation valve 222. Therefore, when used in conjunction with the pressure regulation valve 222, the first rate-control valve 216 is able to more precisely adjust the fluid flow rate to the first motor 206.

In the illustrative embodiment shown in FIG. 2, unless otherwise noted, the second hydraulic subsystem 204 includes the same components, which have the same structure and are arranged in the same way, as that of the first hydraulic subsystem 202. For example, the second hydraulic subsystem 204 includes the second motor 208 fluidly coupled to the second pump 214. In the illustrative embodiment, the second motor 208 is a fixed displacement motor, and the second pump 214 is a fixed displacement pump. A second subassembly, for example, the feeder assembly 154, is coupled to and rotatably driven by the second motor 208. A second rate-control valve 224, for example a solenoid-operated proportional valve, is movable through a range of positions to adjust a flow rate of fluid to the second motor 208. A present speed of the second motor 208 is proportional to a present position of the second rate-control valve 224.

Further, the second hydraulic subsystem 204 includes a second primary motor engagement valve 226, which may be a solenoid-operated proportional relief valve, and a second secondary motor engagement valve 228, which may be a pilot-operated blocking valve. The primary and secondary motor engagement valves 226, 228 cooperate to facilitate or prevent fluid flow to the second motor 208 and the second rate-control valve 224, as described above with respect to the motor engagement valves 218, 220.

Further, the second hydraulic subsystem 204 includes a second pressure regulation valve 230 coupled to an inlet side 223 and an outlet side 225 of the second rate-control valve 224. Similar to the first pressure regulation valve 222, the second pressure regulation valve 230 is configured to facilitate fluid flow across the second rate-control valve 224 at a flow rate that is more consistent over time than the flow rate across the second motor 208 based on a load applied to the second motor 208 by the subassembly coupled thereto. It should be appreciated that either or both of the pressure regulation valves 222, 230 may be eliminated from their respective hydraulic subsystems 202, 204 based on the desired precision of motor speed control.

Figure 3:
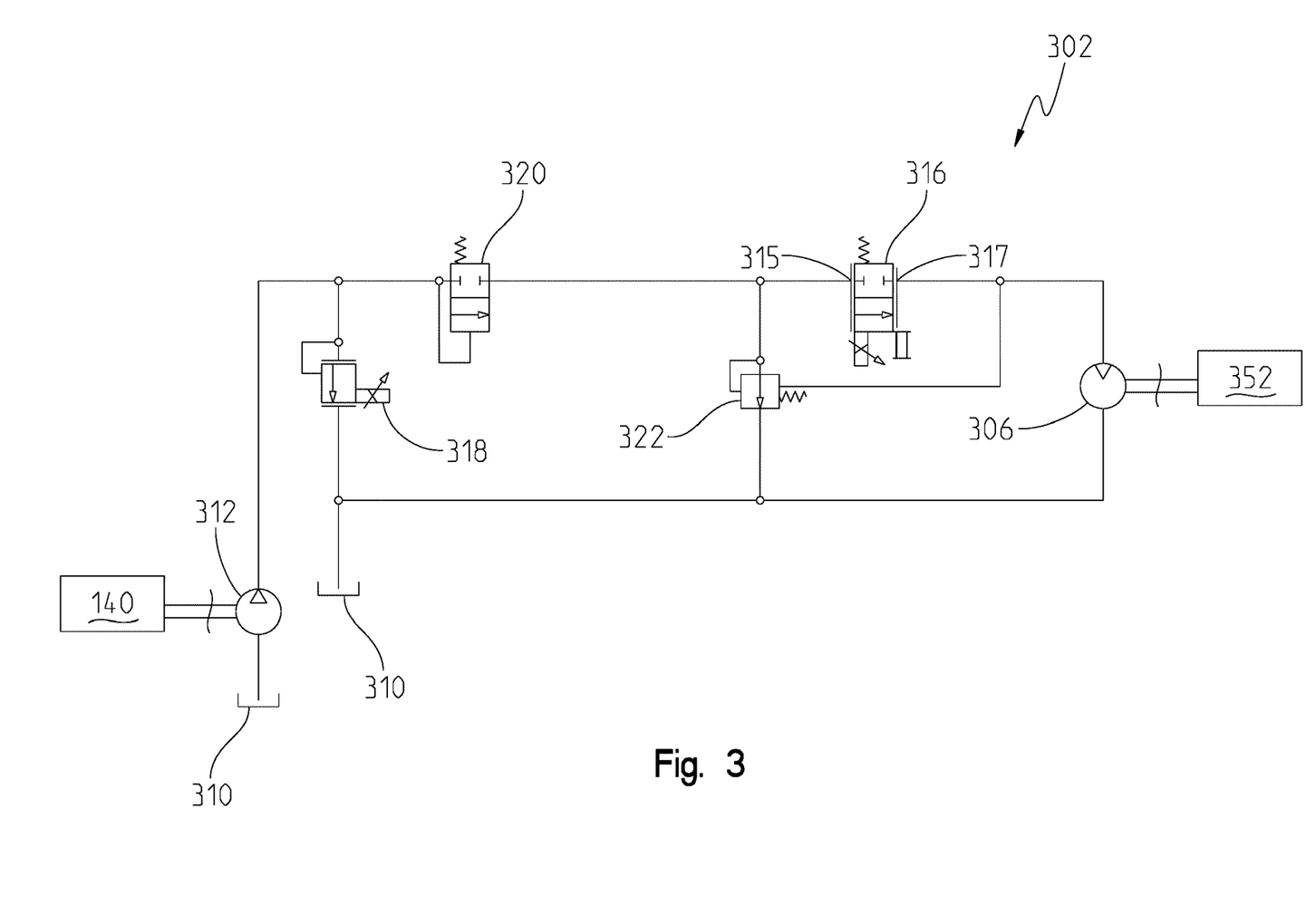
FIG. 3 is a schematic view of another hydraulic subsystem showing a fixed displacement pump, a fixed displacement motor, and a rate-control valve configured to adjust a flow rate of fluid to the fixed displacement motor.

FIG. 3 illustrates a hydraulic subsystem 302 having a tank 310. While a single hydraulic subsystem 302 is shown in FIG. 3, it should be appreciated that two or more hydraulic subsystems may be coupled together such that they share a common tank. The two or more hydraulic subsystems may each take the form of the hydraulic subsystem 302, the hydraulic subsystems 202, 204 (as shown in FIG. 2), or any combination of these hydraulic sub systems.

The hydraulic subsystem 302 includes a hydraulic motor 306 illustratively coupled to and configured to drive operation of a subassembly 352 of a work machine. The subassembly 352 may be, for example, the beater assembly 152 or the feeder assembly 154 of the cotton harvester 100. In this embodiment, the hydraulic motor 306 is a fixed displacement motor. The hydraulic subsystem 302 further includes a pump 312, which, in this embodiment, is a fixed displacement pump. The pump 312 is rotatably driven by an output shaft of the prime mover 140.

As shown in FIG. 3, the first hydraulic subsystem 302 includes a rate-control valve 316 fluidly coupled to the pump 312 and the motor 306. The rate-control valve 316 is movable through a range of positions to adjust a flow rate of fluid to the motor 306. The present speed of the motor 306 is based on the flow rate of fluid to the motor 306, and therefore, the present speed of the motor 306 is proportional to a present position of the rate-control valve 316. In this embodiment, the rate-control valve 316 is a solenoid-operated proportional valve, such that a present position of the rate-control valve 316 is adjustable proportionally to the amount of current supplied to the rate-control valve 316. Therefore, the speed of the motor 306 is ultimately proportional to the amount of current supplied to the rate-control valve 316.

In the embodiment illustratively shown in FIG. 3, the rate-control valve 316 is a normally-closed proportional valve, such that when no current is supplied to the rate-control valve 316, the rate-control valve 316 is disposed in a closed position. Further, the rate-control valve 316 shown in FIG. 2 is arranged in series with the motor 306, such that as the fluid flow rate across the rate-control valve 316 increases, the fluid flow rate to the motor 306 increases. Therefore, the present speed of the motor 306 is directly proportional to the flow rate of fluid across the rate-control valve 316.

As shown in FIG. 3, the hydraulic subsystem 302 illustratively includes a primary motor engagement valve 318 and a secondary motor engagement valve 320. Each motor engagement valve 318, 320, is fluidly coupled to the pump 312 and the motor 306. In this embodiment, the primary and secondary motor engagement valves 318, 320 cooperate to facilitate or to prevent fluid flow to the rate-control valve 316, and ultimately, the motor 306.

The primary motor engagement valve 318 is illustratively shown as a solenoid-operated proportional relief valve that is movable between an open position and a closed position. A present position of the primary motor engagement valve 318 is adjustable proportionally to the amount of current supplied thereto. When the primary motor engagement valve 318 is in the open position, the primary motor engagement valve 318 facilitates fluid flow from the pump 312 to the tank 310. When the primary motor engagement valve 318 is in the closed position, fluid flow across the primary motor engagement valve 318 is blocked, and therefore, pressure builds on an inlet side of the secondary motor engagement valve 320.

The secondary motor engagement valve 320 is illustratively shown as a pilot-operated blocking valve. As pressure builds on the inlet side of the secondary motor engagement valve 320, the secondary motor engagement valve 320 is moved from a closed position to an open position. When the secondary motor engagement valve 320 is the open position, the secondary motor engagement valve 320 facilitates fluid flow to the rate-control valve 316.

It should be appreciated that, in some embodiments, when the primary motor engagement valve 318 is in the closed position, the valve 318 acts as a relief valve. In this case, in the closed position, the primary motor engagement valve 318 facilitates fluid flow across itself when the pressure at the valve 318 is above a predefined threshold pressure associated with the valve 318.

In the illustrative embodiment shown in FIG. 3, the hydraulic subsystem 302 includes a pressure regulation valve 322. The pressure regulation valve 322 is fluidly coupled, via a first line, to an inlet side 315 of the rate-control valve 316 and fluidly coupled, via a second line, to an outlet side 317 of the rate-control valve 316. The first motor 306 may demand fluid at varying flow rates based on the load on the first motor 306. The pressure regulation valve 322 is configured to facilitate fluid flow across the rate-control valve 316 at a flow rate that is more consistent over time than the flow rate across the motor 306 based on a load applied to the motor 306 by the subassembly coupled thereto.

Further, the pressure regulation valve 322 shown in FIG. 3 is a bypass valve arranged in parallel with the motor 306, such that as the fluid flow rate across the pressure regulation valve 322 increases, the fluid flow rate to the motor 306 decreases. Therefore, the speed of the motor 306 is inversely proportional to the flow rate of fluid across the pressure regulation valve 322.

In some embodiments, the pressure regulation valve 322 may be a compensator valve having a spring coupled to a spool that is movable within the valve to regulate the flow rate of fluid output from the pressure regulation valve 322 to the input side 315 of the rate-control valve 316. Thus, the pressure regulation valve 322 limits the range of pressures experienced by the rate-control valve 316, such that rate-control valve 316 only needs to move through a finite range of positions, as compared to the range of positions that the rate-control valve 316 would be required to move through without the pressure regulation valve 322. Accordingly, the rate-control valve 316 may have a reduced flow rate capacity compared to arrangements lacking the pressure regulation valve 322. Therefore, when used in conjunction with the pressure regulation valve 322, the rate-control valve 316 is able to more precisely adjust the fluid flow rate to the motor 306.

It should be appreciated that this disclosure contemplates an arrangement of components in which the secondary motor engagement valve 320 is omitted from the hydraulic subsystem 302. In this embodiment, the rate-control valve 316 is a normally-closed proportional valve, and therefore, undesired fluid flow from the pump 312 to the motor 306 may be blocked by the rate-control valve 316 when the rate-control valve 316 is disposed in its normally-closed un-energized position. Therefore, the blocking function of the secondary motor engagement valve 320 may be redundant, which allows for omission of the secondary motor engagement valve 320 from the hydraulic subsystem 302 in some embodiments.

Figure 4:
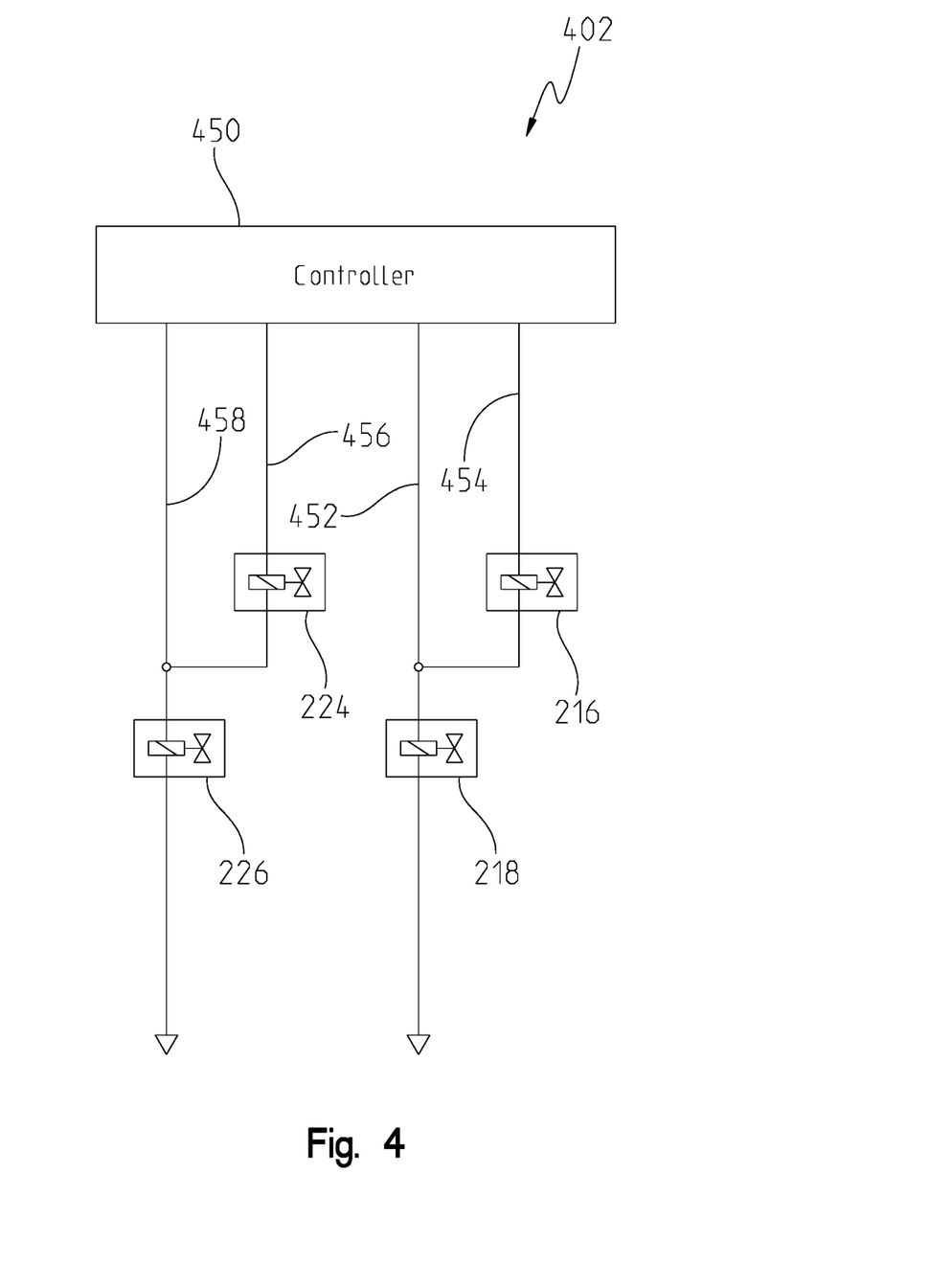
FIG. 4 is a schematic view of an electrical subsystem for controlling various components of the hydraulic subsystems shown in FIG. 2.

Referring now to FIG. 4, an electrical schematic is shown to describe an exemplary electrical control subsystem 402 for the hydraulic subsystems 202, 204 described herein. It should be appreciated that the hydraulic subsystems described herein may be controlled according to other electrical or non-electrical schemes as well. As described, the hydraulic subsystems 202, 204 each include a rate-control valve that may be a solenoid-operated valve (i.e. valves 216, 224) and a primary motor engagement valve that may be a solenoid-operated valve (i.e. valves 218, 226). The electrical control subsystem 402 illustrates an exemplary arrangement that allows each solenoid-operated valve 216, 218, 224, 226 to be commanded by a controller 450.

The controller 450 may be a single controller or a plurality of controllers, which may be operatively coupled to one another. The controller 450 includes a memory and a processor configured to execute instructions (i.e. algorithmic steps) stored on the memory. The controller 450 may be operatively coupled (i.e. hardwired or connected wirelessly) to other components of the work machine. If hardwired, the controller 450 may be connected to the components via wires, and if connected wirelessly, the controller 450 may be connected to the components via Wi-Fi, Bluetooth, or other known means of wireless communication. Thus, the controller 450 may be positioned on the work machine or positioned remotely, away from the work machine.

In the illustrative embodiment, as shown in FIG. 4, the electrical control subsystem 402 includes a first high side portion 452 and a first low side portion 454. The first high side portion 452 operatively couples together the controller 450, the first proportional valve 216, and the first primary motor engagement valve 218. The first low side portion 454 operatively couples together the controller 450 and the first proportional valve 216. While in the illustrative embodiment, a single high-side/low-side configuration is used to control both valves (e.g., valves 216, 218), in some embodiments, each valve (e.g., valves 216, 218) may be independently controlled by a separate high-side/low-side configuration.

In the illustrative embodiment, the controller 450 is configured to output a first signal, via the high side portion 452, to the first primary motor engagement valve 218 and the first rate-control valve 216, simultaneously. Receipt of the first signal by first primary motor engagement valve 218 causes movement of the first primary motor engagement valve 218 to a closed position. While in some embodiments, receipt of the first signal by the first rate-control valve 216 could cause movement of the first rate-control valve 216 to a closed position, in the illustrative embodiment, receipt of the first signal by the first rate-control valve 216 does not cause movement of the first rate-control valve 216.

Referring still to FIG. 4, the controller 450 is also configured to output one or more second signals, via the low side portion 454, to the first rate-control valve 216. Receipt of the one or more second signals by the first rate-control valve 216 causes movement of the first rate-control valve 216 to adjust the fluid flow rate to the first motor 206. The controller 450 is configured to output the one or more second signals subsequent to outputting the first signal.

It should be appreciated that the one or more second signals are not sent to the first primary motor engagement valve 218 since the first primary motor engagement valve 218 is not coupled to the controller 450 via the low side portion 454. The one or more second signals may be referred to as current-adjustment signals. The current-adjustment signals adjust the present motor speed toward the target motor speed, as will be described with reference to FIG. 5 below.

Figure 5:
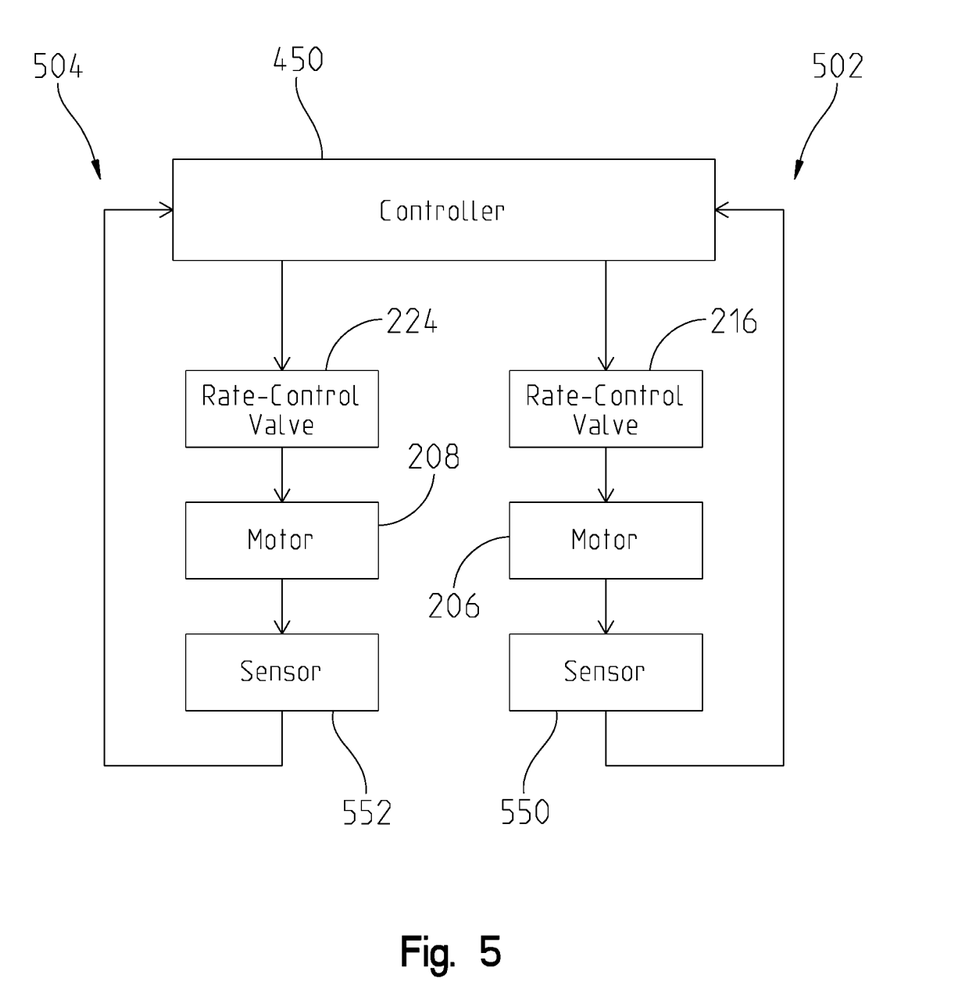
FIG. 5 is diagram of a closed loop control system including components of the electrical subsystem of FIG. 4 and the hydraulic subsystem of FIG. 2.

As suggested by FIG. 5, the controller 450 is included in one or more closed loop control systems, (e.g., 502, 504). The closed loop control system 502 further includes the first rate-control valve 216, the first motor 206, and a first speed sensor 550 that is configured to monitor the present motor speed of the first motor 206. The first speed sensor 550 may be any type of sensor suitable for sensing present motor speed. For example, the sensor 550 may be a hall-effect sensor that detects movement of rotating gear teeth during operation of the first motor 206.

The first speed sensor 550 is operatively coupled to the controller 450 and configured to send signals thereto indicative of the present motor speed of the first motor 206. The memory of the controller 450 may have the target motor speed stored thereon. The target motor speed may be predefined based on the subassembly that is configured to be driven by the first motor 206. The target motor speed may be fixed or may vary during operation of the work machine. The target motor speed may be determined automatically by the controller 450 based on factors associated with operation of the work machine, or the target motor speed may be manually input via an input device operatively coupled to the controller 450.

As shown in FIG. 5, in operation of the closed loop control system 502, the controller 450 sends a current-adjustment signal to the first rate-control valve 216 to adjust the present position of the first rate-control valve 216. The present speed of the first motor 206 is adjusted proportionally to the present position of the first rate-control valve 216. The first speed sensor 550 detects the present motor speed of the first motor 206 and sends a signal to the controller 450 indicative of the present motor speed of the first motor 206. The controller 450 compares the present motor speed to the target motor speed. If the present motor speed does not equal (or is not within a threshold range of) the target motor speed of the first motor 206, then the controller 450 sends an additional current-adjustment signal to the first rate-control valve 216 to adjust the present motor speed toward the target motor speed. This process is repeated during operation of the work machine.

As suggested by FIG. 4, the electrical control subsystem 402 controls the second hydraulic subsystem 204 (e.g., valves 224, 226) in the same way as it controls the first hydraulic subsystem 202 (e.g., valves 216, 218) using identical components arranged in the same way. For example, the controller 450 sends a first signal, via a high side portion 458, to the second primary motor engagement valve 226 and to the second rate-control valve 224 to close the valve 226. Subsequently, the controller 450 sends a current-adjustment signal, via a low side portion 456, to the second rate-control valve 224 to adjust the fluid flow rate to the second motor 208.

As shown in FIG. 5, in operation of the closed loop control system 504, the controller 450 sends a current-adjustment signal to the second rate-control valve 224 to adjust the present position of the second rate-control valve 224. The present speed of the second motor 208 is adjusted proportionally to the present position of the second rate-control valve 224. A second speed sensor 552 detects the present motor speed of the second motor 208 and sends a signal to the controller 450 indicative of the present motor speed of the second motor 208. The controller 450 compares the present motor speed to the target motor speed. If the present motor speed does not equal (or is not within a threshold range of) the target motor speed of the second motor 208, then the controller 450 sends an additional current-adjustment signal to the second rate-control valve 224 to adjust the present motor speed toward the target motor speed.

Figure 6:
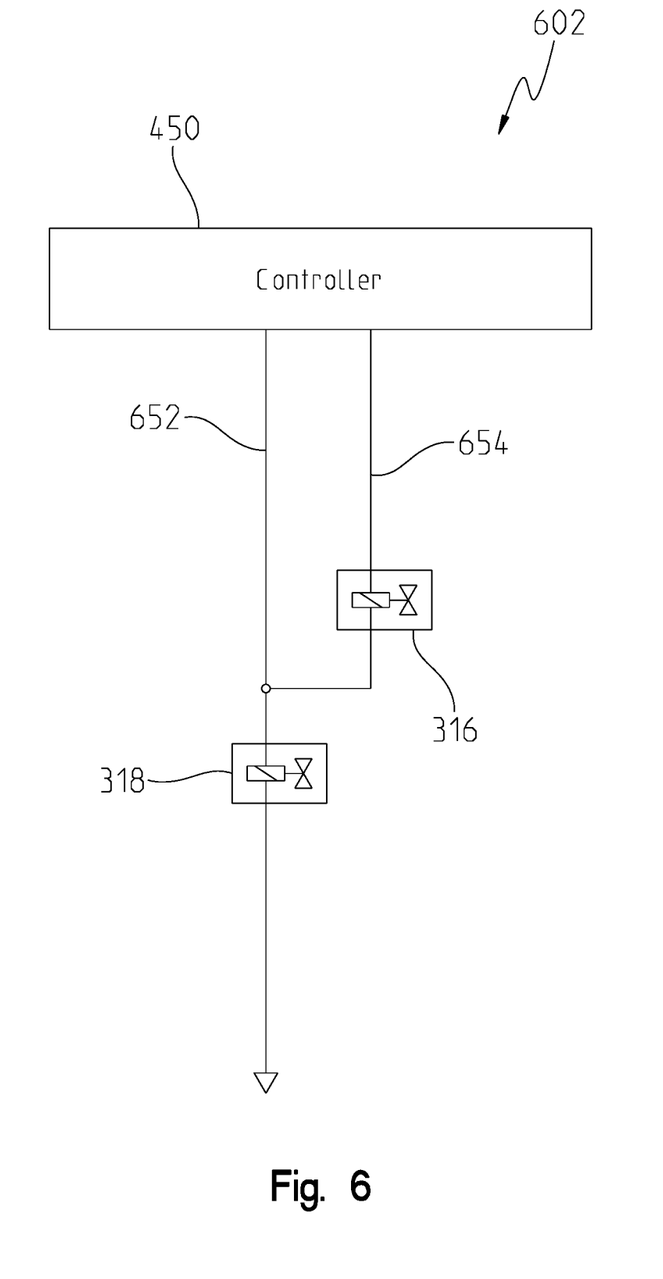
FIG. 6 is a schematic view of an electrical subsystem for controlling various components of the hydraulic subsystem shown in FIG. 3.
Figure 7:
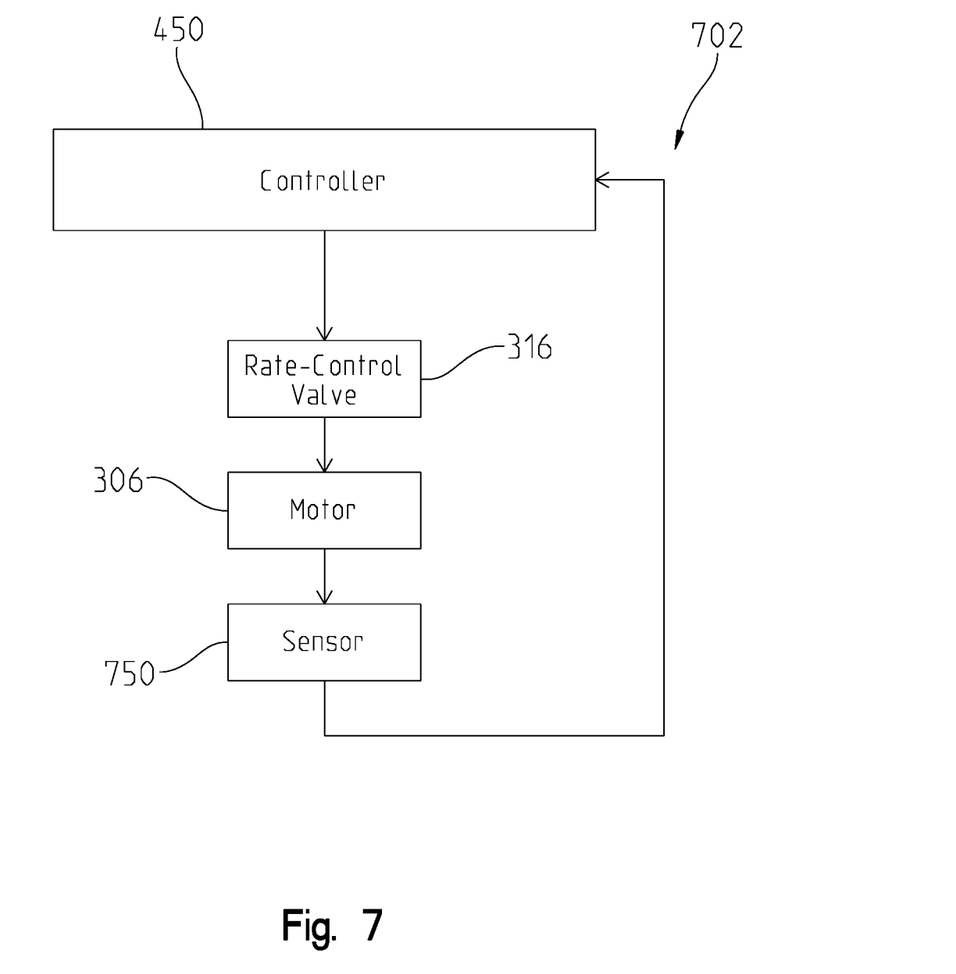
FIG. 7 is diagram of a closed loop control system including components of the electrical subsystem of FIG. 6 and the hydraulic subsystem of FIG. 3.

FIGS. 6 and 7 illustrate that the components and arrangement of the electrical control subsystem described above are equally applicable to an electrical control subsystem 602, which is used to control the hydraulic subsystem 302. For example, as suggested by FIG. 6, the controller 450 sends a first signal, via a high side portion 652, to the primary motor engagement valve 318 and to the rate-control valve 316. Receipt of the first signal causes the primary motor engagement valve 318 to close. Subsequently, the controller 450 sends a current-adjustment signal, via a low side portion 654, to the rate-control valve 316 to adjust the fluid flow rate to the motor 306.

As shown in FIG. 7, in operation of a closed loop control system 702, the controller 450 sends a current-adjustment signal to the rate-control valve 316 to adjust the present position of the rate-control valve 316. The present speed of the motor 306 is adjusted proportionally to the present position of the rate-control valve 316. A speed sensor 750 detects the present motor speed of the motor 306 and sends a signal to the controller 450 indicative of the present motor speed of the motor 306. The controller 450 compares the present motor speed to the target motor speed. If the present motor speed does not equal (or is not within a threshold range of) the target motor speed of the motor 306, then the controller 450 sends an additional current-adjustment signal to the rate-control valve 316 to adjust the present motor speed toward the target motor speed.

It should be appreciated that the hydraulic subsystems described herein may be controlled according to other electrical or non-electrical schemes as well. For example, the rate-control valves 216, 224, 316 have been described in exemplary embodiments herein as being solenoid-operated valves adjustable based on the amount of current supplied to the valves by command of the controller 450. In other exemplary embodiments, the rate-control valves 216, 224, 316 may be manually-operated valves adjustable by a user to adjust, in turn, the present speed of the respective motor that is fluidly coupled thereto. Similarly, the primary motor engagement valves (218, 226, 318) may be manually operated valves adjustable between fully open and fully closed positions to facilitate or prevent fluid flow to the respective motor that is fluidly coupled thereto.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A work machine comprising:
a first pump;
a first motor fluidly coupled to the first pump;
a first subassembly coupled to and driven by the first motor;
a first rate-control valve fluidly coupled to the first pump and the first motor and movable through a range of positions to adjust a flow rate to the first motor;
a controller operatively coupled to the first rate-control valve and configured to output current-adjustment signals to the first rate-control valve to adjust a present position of the first rate-control valve;
a primary motor engagement valve fluidly coupled to the first pump and the first motor; and
a secondary motor engagement valve fluidly coupled to the first pump and the first motor and configured to move from a closed position to an open position in response to movement of the primary motor engagement valve to facilitate fluid flow to the first rate-control valve;
wherein a speed of the first motor is proportional to the present position of the first rate-control valve.

2. The work machine of claim 1, wherein the first subassembly is one of a feeder assembly and a beater assembly, each configured to process harvested cotton.

3. The work machine of claim 2, further comprising:
a second pump;
an engine coupled to and configured to provide power to the first pump and the second pump;
a second motor fluidly coupled to the second pump;

a second subassembly coupled to and rotatably driven by the second motor; and a second rate-control valve movable through a range of positions to adjust a flow rate to the second motor;

wherein a speed of the second motor is proportional to a present position of the second rate-control valve; and wherein the second subassembly is the other of a feeder assembly and a beater assembly.

4. The work machine of claim 1, further comprising:
a pressure regulation valve fluidly coupled to the first rate-control valve at an inlet side of the first rate-control valve and an outlet side of the first rate-control valve.

5. The work machine of claim 4, wherein the pressure regulation valve is configured to facilitate fluid flow across first rate-control valve at a pressure that is more consistent than a pressure across the first motor based on a load applied to the first motor by the first subassembly.

6. The work machine of claim 1, wherein the first rate-control valve is normally biased toward a closed position.

7. The work machine of claim 6, wherein the speed of the first motor is directly proportional to a flow rate of fluid across the first rate-control valve.

8. The work machine of claim 1, wherein the first motor is a fixed displacement motor; and
wherein the first pump is a fixed displacement pump.

9. A cotton harvester comprising:
a pump;
a motor fluidly coupled to the pump;
a rotatable subassembly coupled to and rotatably driven by the motor, the rotatable subassembly being one of a feeder assembly and a beater assembly, each being configured to process harvested cotton;
a rate-control valve fluidly coupled to the pump and the motor and movable through a range of positions to adjust a fluid flow rate to the motor;
a primary motor engagement valve fluidly coupled to the pump and the motor; and
a controller operatively coupled to the rate-control valve and the primary motor engagement valve;
wherein the controller is configured output:
a first set of one or more signals to: (i) the primary motor engagement valve causing movement of the primary motor engagement valve which facilitates fluid flow to the motor and (ii) the rate-control valve, and
a second set of one or more signals to the rate-control valve causing movement of the rate-control valve to adjust the fluid flow rate to the motor.

10. The cotton harvester of claim 9, wherein the controller includes a memory having a target motor speed stored thereon;
wherein the controller is operatively coupled to a speed sensor configured to monitor a present motor speed;
wherein the controller is configured to receive a signal indicative of the present motor speed from the speed sensor; and
wherein the movement of the rate-control valve is based on the target motor speed and the present motor speed.

11. The cotton harvester of claim 9, further comprising:
a pressure regulation valve fluidly coupled to the rate-control valve at an inlet side of the rate-control valve and an outlet side of the rate-control valve;

wherein the pressure regulation valve is configured to facilitate fluid flow across rate-control valve at a pressure that is more consistent than a pressure across the motor based on a load applied to the motor by the rotatable subassembly.

12. The work machine of claim 1, wherein the speed of the first motor is inversely proportional to a flow rate of fluid across the first rate-control valve.

13. A work machine comprising:
a first pump;
a first motor fluidly coupled to the first pump;
a first subassembly coupled to and driven by the first motor; and
a first rate-control valve fluidly coupled to the first pump and the first motor and movable through a range of positions to adjust a flow rate to the first motor;
wherein a speed of the first motor is proportional to a present position of the first rate-control valve;
wherein the first rate-control valve is normally biased toward an open position; and
wherein the first motor and the first rate-control valve are arranged in parallel to one another.

14. The work machine of claim 13, wherein the first motor is a fixed displacement motor.

15. The work machine of claim 13, wherein the first pump is a fixed displacement pump.

16. The work machine of claim 13, wherein the first subassembly is one of a feeder assembly and a beater assembly, each configured to process harvested cotton.

17. The work machine of claim 13, further comprising a controller and a primary motor engagement valve;
wherein the controller is operatively coupled to the first rate-control valve and configured to output current-adjustment signals to the first rate-control valve to adjust the position of the first rate-control valve; and
wherein the controller is operatively coupled to the primary motor engagement valve and configured to output a first signal to the primary motor engagement valve prior to outputting the current-adjustment signals to the first rate-control valve.

18. A work machine comprising:
a first pump;
a first motor fluidly coupled to the first pump;
a first subassembly coupled to and driven by the first motor;
a first rate-control valve fluidly coupled to the first pump and the first motor and movable through a range of positions to adjust a flow rate to the first motor;
a controller operatively coupled to the first rate-control valve and configured to output current-adjustment signals to the first rate-control valve to adjust a present position of the first rate-control valve; and
a primary motor engagement valve fluidly coupled to the first pump and the first motor;
wherein the controller is operatively coupled to the primary motor engagement valve and configured to output a first signal to the primary motor engagement valve, prior to outputting the current-adjustment signals, to cause movement of primary motor engagement valve which facilitates fluid flow to the first motor; and
wherein prior to movement of the primary motor engagement valve fluid flow is not permitted to the first motor.

* * * * *